Nov. 8, 1966 J. L. HARRIS 3,284,588
APPLIANCE TIMER

Original Filed Sept. 27, 1954 2 Sheets-Sheet 1

INVENTOR.
John L. Harris

Nov. 8, 1966   J. L. HARRIS   3,284,588
APPLIANCE TIMER
Original Filed Sept. 27, 1954
2 Sheets-Sheet 2

INVENTOR.
John L. Harris

United States Patent Office 3,284,588
Patented Nov. 8, 1966

3,284,588
APPLIANCE TIMER
John L. Harris, Whitefish Bay, Wis., assignor to Miller-Harris Instruments Company, Milwaukee, Wis., a corporation of Wisconsin
Continuation of application Ser. No. 813,169, May 14, 1959, which is a division of application Ser. No. 458,421, Sept. 27, 1954, now Patent No. 2,917,988, dated Dec. 22, 1959. This application Aug. 17, 1962, Ser. No. 217,699
3 Claims. (Cl. 200—38)

This application is a continuation of application Serial No. 813,169, filed May 14, 1959, now abandoned, which is a division of application Serial No. 458,421, filed September 27, 1954, now Patent No. 2,917,988.

This invention relates to control devices, and more particularly to devices for controlling temperature and cooking time in cooking appliances.

In recent years, a new type cooking appliance known as a rotisserie-broiler has become popular. This device consists of a housing which is open at the front and which contains an electric heater mounted in the top which radiates downwardly on the food being broiled. These rotisserie-broilers are also provided with a motor driven spit upon which the food may be mounted so that it rotates as it is broiled.

Prior to applicant's invention, these devices were controlled by means of a timer, a motor switch, and a multiple heat control switch. These devices were all separate, requiring interwiring. Also, the heater had to be tapped so that the multiple heat switch could provide different heats.

The primary object of the invention is to provide a simple, low cost and dependable unit which controls both the heater and spit motor, which provides for timing of the cooking, signalling when the timed period has expired, and which also provides infinite control of the heat during the cooking operation.

A further object of the invention is to provide a combination time and temperature control mechanism for rotisseries in which a single switch is cycled for controlling temperature during the cooking operation and is opened by the timer at the end of the timed period.

Other objects of the invention are to provide improved and simplified timer and heat control construction and operation and will appear from the following description and appended claims.

For a full disclosure of the invention, reference is made to the following detailed description and the accompanying drawings, in which.

Figures 1, 2:
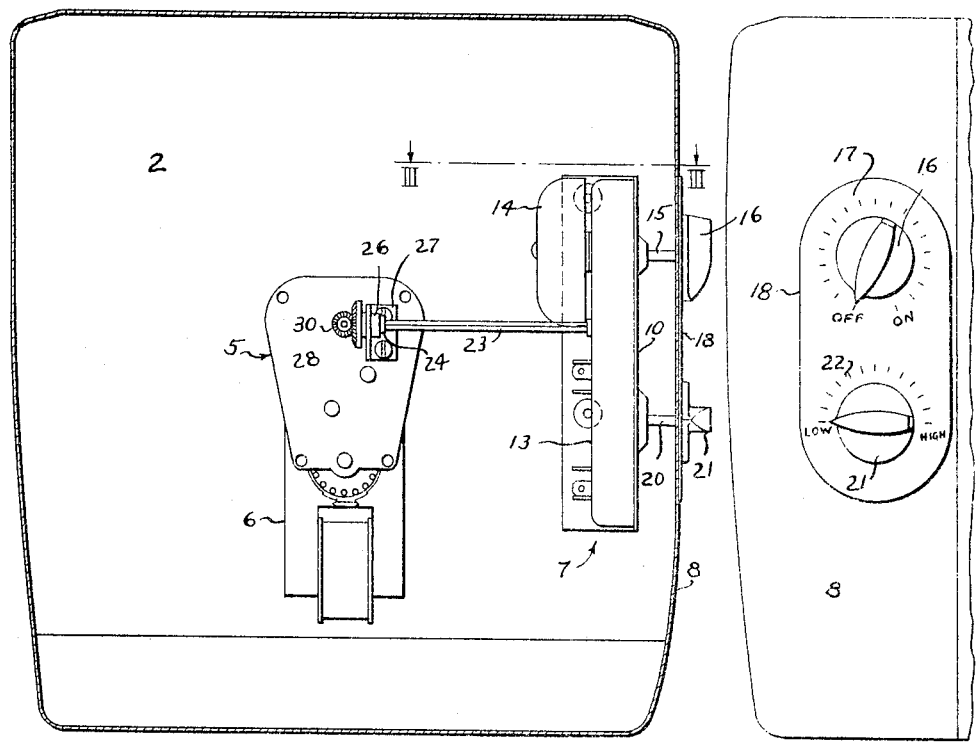
FIGURE 1 is an end view of a rotisserie-broiler with the cover cut away to show the motor and timer mechanism.
FIGURE 2 is a front view of the end shell of the broiler showing the control knobs and escutcheon plate.
Figures 3, 4:
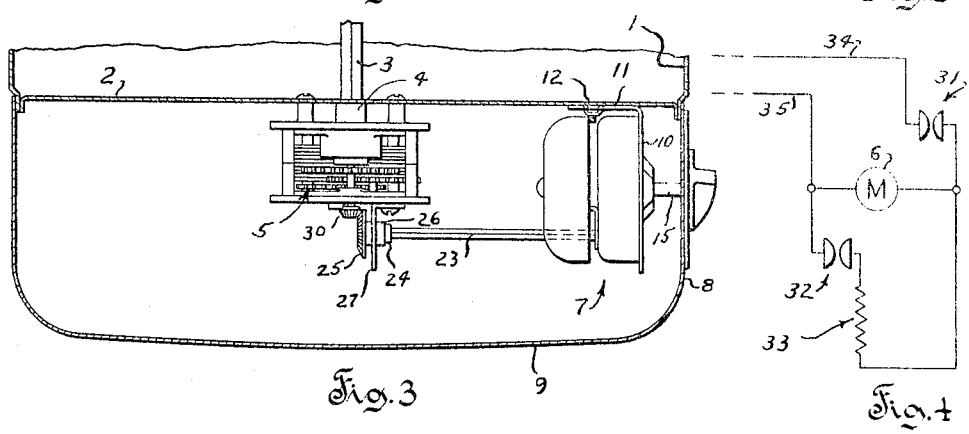
FIGURE 3 is a top view taken on line III—III of FIGURE 1.
FIGURE 4 is a wiring diagram.

Referring first to FIGURES 1, 2, and 3, the rotisserie-broiler is shown only fragmentarily and consists of a cooking section 1 having an end panel 2. A spit 3 extends through the cooking section for holding the food being cooked. The spit 3 is received in a hub 4 which is rotated through a gear train 5, driven by an electric motor 6. A combination timer and heat control mechanism 7 is mounted on the end panel adjacent to the front 8 of an end shell 9. This end shell is mounted on the rotisserie body 1 and serves to cover the motor and control unit. The control unit is provided with a mounting bracket 10 which is L-shaped, one portion serving as the front of the control unit and the other portion 11 being secured to the end panel 2 by means of screws 12. The control unit also includes a rear housing 13 which carries a bell 14. A time control shaft 15 extends forwardly from the control unit through the end shell front 8 and carries a knob 16 which co-operates with a time scale 17 carried on an escutcheon plate 18. A heat control shaft 20 also extends from the control unit through the end shell and carries a knob 21 co-operating with a heat scale 22 also carried on the escutcheon plate.

The control unit 7 is driven by the motor 6 through the gear train 5 and a drive shaft 23. This drive shaft is preferably square and is received in a socket in a hub 24 which carries a bevel gear 25. The hub 24 runs in a bearing 26 which is supported by a bracket 27 attached to the gear train side plate 28. The bevel gear 25 is driven by a pinion 30 which is attached to the final shaft of the gear train.

Figure 6:
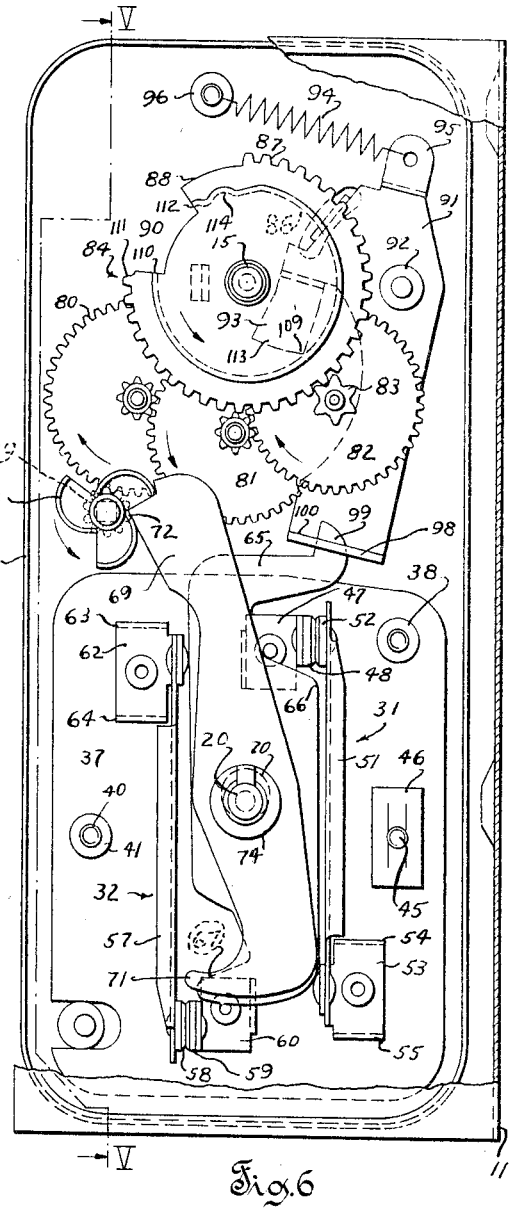
FIGURE 6 is a front view of the control unit with the front cover cut away to show the internal mechanism.

As shown in FIGURE 6 the control unit includes a main switch 31 and a heat control switch 32. These switches are biased closed and connected to the motor 6 and the rotisserie heater 33 in accordance with the wiring diagram shown in FIGURE 4. It will be noted that the switch 31 is connected between one side 34 of the power cord and both the motor 6 and heater 33. The switch 32 is connected between the other side 35 of the power cord and the heater 33. The switch 31 thus controls both the motor and heater whereas the switch 32 controls only the heater.

Figure 5:
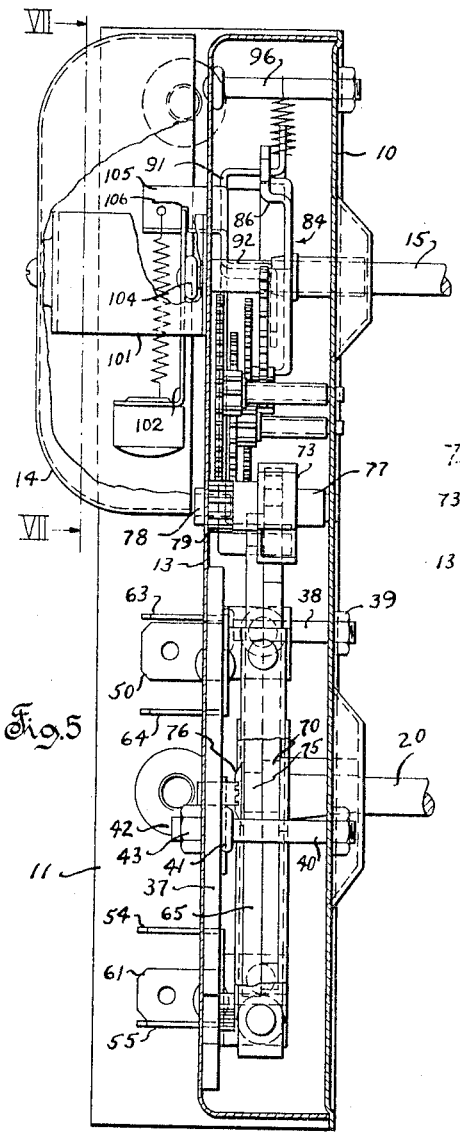
FIGURE 5 is a side sectional view of the control unit taken on line V—V of FIGURE 6.

Referring now to FIGURES 5 and 6, the switches 31 and 32 are mounted on a terminal panel 37. This panel is secured to the back of the rear housing 13 by means of a stud 38 which is staked to the rear housing. This stud extends through the housing and is threaded at its end to receive a nut 39 (FIGURE 5) which holds the front and rear housing members together. The panel 37 is also secured to the rear housing by a stud 40. This stud is formed with an enlarged portion 41 and a threaded shank 42 which receives a nut 43. This nut serves to clamp the panel 37 to the rear of housing 13. The panel is also clamped to the housing by means of a screw 45 which extends through the housing and panel and fits into a stamped lock nut 46.

The switch 31 consists of a contact bracket 47 which is riveted to the panel. One portion of the bracket is bent inwardly to carry a stationary contact 48. Another portion of the bracket 47 is bent rearwardly and extends through the panel to provide a tap 50 for external electrical connection. The switch blade 51 carries a contact 52 which co-operates with the contact 47. This switch blade is supported on a bracket 53 which is riveted to the panel and is formed with two tabs 54 and 55 which extend rearwardly through the panel. Referring to the wiring diagram of FIGURE 4, the tab 50 of the contact bracket is attached to the line wire 34. The tab 54 of the switch blade bracket is connected to the motor 6 and the tab 55 of the bracket is attached to the heater 33. The switch 32 is constructed in the same manner as switch 31 but extends in the opposite direction. This switch includes a switch blade 57 carrying a contact 58 which co-operates with a stationary contact 59 carried by the bracket 60 having a tab portion 61. The blade 57 is carried by a contact bracket 62 having tab portions 63 and 64. In the wiring diagram of FIGURE 4 the tab 61 is attached to the heater 33, the tab 64 is attached to the motor and the tab 63 is attached to the line wire 35.

The swiches 31 and 32 are operated by a plastic switch operator 65. This switch operator is pivotally supported on the heat control shaft 20. This operator includes a portion 66 which is adapted to engage and push the switch blade 51 outwardly for separating contact 52 from its co-operating stationary contact when the operator 65 is rotated in a clockwise direction from the position shown. This operator also includes a portion 67 which is adapted to engage the switch blade 57. This portion 67 pushes the switch blade 57 to the left when the operator 65 is rotated clockwise about its pivot, thus separating contacts 58 and 59. It will be apparent that when the operator 65 is in the position shown it allows switches 31 and 32 to close. However, when the operator 65 is rotated clockwise from the position shown it forces switches 31 and 32 into their open positions.

The heat control switch is opened independently of operator 65 by means of a cam follower 69 which is pivoted on an eccentric 70 carried by the heat control shaft 20. The cam follower 69 at its lower portion 71 engages the blade 57 and at its upper portion 72 rides a cam 73. The eccentric shaft 20 is provided with an enlarged portion 74 which retains the cam follower 72 in place. As shown in FIGURE 5, the switch operator 65 is mounted on a concentric portion 75 of the heat control shaft at the rear of the cam follower 69. A retainer 76 serves to hold the switch operator in place adjacent to the cam follower 69.

The cam 73 is preferably cast on a shaft 77 which is supported between the rear housing 13 and the front plate 10. The shaft 77 is provided with a socket 78 which receives the drive shaft 23 (FIGURE 1). The shaft 77 is also formed with a pinion section 79 which drives the gear 80 which in turn drives gears 81 and 82. The gear 82 drives a pinion 83 through a friction clutch so that the pinion 83 may be rotated while the gear 82 remains stationary. The pinion 83 drives a combination cam and gear 84 which is mounted on the time control shaft 15. As shown in FIGURE 5 the member 84 is dished forwardly to provide an internal cam surface 86. The member 84 also includes a toothed section 87 forming a gear and also is provided with a vacant section 88 in which the gear teeth are omitted. The cam surface 86 is broken away at 90. A cam follower 91 is pivotally supported on a shaft 92 which extends between the front and rear plates 10 and 13. As shown in FIGURE 5 the main section of the cam follower 91 is located closely adjacent to the rear plate 13 behind the cam member 84. A cam follower section 93 is off-set into the interior of the cam member 84 and rides on the cam surface 86. A spring 94 is attached to another off-set portion 95 of the cam follower and its other end is attached to a stud 96. This stud is mounted in the rear housing and also functions to clamp the front and rear housing members together. At its lower end the cam follower 91 is bent outwardly and is provided with a slot 98 which receives the upper end 99 of the cam follower 65. When the cam follower portion 93 rides the cam surface 86 (as shown) the out-turned portion 100 permits the switch operator 65 to assume the position shown in which the switches 31 and 32 may close. However, when the cam member 84 is rotated to the position in which the cam follower section 93 drops into the slot 90 in the cam surface, the cam follower is rotated by spring 94 in a counter-clockwise direction. At this time the section 100 of the cam follower forces the switch operator in a clockwise direction for opening switches 31 and 32.

Figure 7:
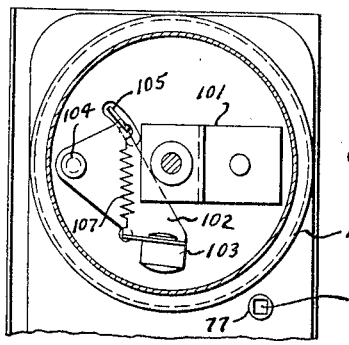
FIGURE 7 is a rear sectional view taken on line VII—VII of FIGURE 5.

The bell 14 is secured to the rear housing 13 by means of a bracket 101 which is riveted to the rear housing. Located under the bell is a striker lever 102 which carries a weight 103 adapted to strike the bell. The striker lever 102 is secured to a stud 104 which extends internally of the shaft 92 but which fits loosely within the shaft so that it may rotate relative to the shaft. As shown more clearly in FIGURE 5 the cam follower 91 is formed with a rearwardly extending tab 105 having a slot 106 in which the striker lever 102 loosely fits. A spring 107 is attached to this tab and also to the striker lever for biasing the lever upwardly as shown in FIGURE 7. When the cam follower is in the position shown in FIGURE 6 the striker lever assumes the position shown in FIGURE 7. However, when the cam follower portion 93 drops into the cam slot 90, the tab portion 105 snaps downwardly as shown in FIGURE 7, causing the weight 103 to strike the bell. During the snapping motion of the cam follower the inertia of the weight 103 causes the striker lever 102 to advance beyond the position driven by the cam follower tab 105. The spring 107 then pulls the striker lever into engagement with the tab 105 for permitting the bell to ring.

*Operation*

In operation the user sets knob 21 on the heat control scale to the desired amount of heat and turns the knob 16 to the desired amount of time. When knob 16 is turned, the cam member 84 will assume a position such as shown in FIGURE 6, in which the cam follower 91 permits the switch operator 65 to assume the position in which switches 31 and 32 are closed. Closure of switch 31 energizes the motor 6 and closure of both switches 31 and 32 energizes the heating element 33. The motor now operates to turn the spit 3 and also to drive the cam 73 in a counter-clockwise direction. The pinion section 79 on the cam shaft drives the gear train and causes the cam member 84 to revolve in a counter-clockwise direction. As the cam 73 revolves, it rocks the cam follower 69 about its pivot which is the eccentric 70 on shaft 20. As the cam revolves it rotates the cam follower 69 clockwise, first taking up the clearance between the portion 71 of the follower and the switch blade 57. Upon continued movement the contacts 58 and 59 are separated which deenergizes the heating element even though the switch 31 remains closed. When the cam rotates to the position in which the cam lobe rides beyond the end of the cam follower, the tension of the switch blade 57 forces the cam follower in the counter-clockwise direction and contacts 58 and 59 again close. The percentage of time that the contacts 58 and 59 are closed during each cycle depends upon the position of the eccentric 70. When the heat control shaft is rotated counter-clockwise from the position shown it shifts the pivot point of the cam follower to the left which causes the contacts to open at an earlier point in the time cycle. This reduces the percentage of time that the contacts are closed and thus reduces the amount of heat supplied by the heater 33. When the heat control shaft is rotated clockwise, it shifts the pivot point of the cam follower to the right and thus delays the point in the time cycle at which contacts 58 and 59 open. When the knob 21 is rotated to the position marked "HIGH" on the temperature scale the pivot point of the cam follower is sufficiently far to the right that the contacts 58 and 59 never disengage. This provides maximum heat from the heater. By properly proportioning the curvature of cam 73 the temperature scale may be made substantially straight line percentage even though the pivot of the cam follower is being shifted in an arc by the eccentric.

The speed of the cam 73 and the number of lobes of the cam are preferably selected to provide an operation of the switch 32 at frequent intervals approximately 7.5 seconds apart. This cycle gives good results in rotisseries using both exposed wire heaters and enclosed heaters. Where the heater is of the exposed wire type the cycle must be frequent enough to avoid the heater arriving at maximum temperature and then cooling to a point in which it is no longer red. Where the heater element is of the enclosed type having a relatively high thermal inertia the time cycle may be increased as high as 30 to 60 seconds or even longer.

The control unit will function to cycle the heater on and off at relatively frequent intervals and at a percentage set on the heat control scale until the cam member 84 rotates to the position at which the point 109 of the cam follower portion 93 engages the end 110 of the cam surface 86. At this time the end tooth 111 of the cam member has passed slightly beyond the pinion 83 so that the pinion 83 cannot hold the cam member 84 back. Due to the bias of the cam follower by spring 94, the section 93 of the cam follower drops into the slot 90 in the cam surface and causes the cam to move with snap action to the "OFF" position. This permits the cam follower to snap in a counter-clockwise direction thus rotating the switch operator 65 clockwise for opening both switches 31 and 32. This snap action movement of the cam follower 91 also causes snap action movement of the bell striker lever 102 for ringing the bell which signals the user that the cooking cycle is over.

It will be noted that the portion 109 of cam follower 93 rides the cam member 84 at a point adjacent the pinion 83. This presses the gear teeth 87 toward engagement with the pinion 83. The bearing hole for the cam shaft 15 and the backplate 13 is made oversize so that the cam member in effect is mounted on a loose fitting bearing. In normal operation the pressure of the cam follower on the cam takes up the slack provided by this loose fitting bearing. Sometimes when the timer is set, the end tooth 111 may contact the top of a tooth on the pinion which would prevent further rotation of the cam shaft. However, due to the loose fitting bearing the cam and shaft back away from the pinion enough to let tooth 111 slide past the pinion tooth. This allows the gears to re-engage.

For short cooking operations where timing is not desired, the knob 16 may be turned to the position marked "ON" on the scale 17. During this movement from "OFF" to "ON," the edge 112 of the cam rides on the surface 113 of the cam follower which rotates the cam follower back to the "ON" position. When the knob 16 is in the "ON" position the portion 109 of the cam follower engages the detent 114 formed in the cam member 84. A sufficient number of gear teeth are omitted from the cam member so that when the cam member is in this position, no gear teeth are in engagement with the pinion. Thus the shaft 15 remains stationary. In other words, the device does not operate as a timer when the knob is turned to the "ON" position.

From the foregoing it will be apparent that the present invention provides a single low-cost unitary device for both timing and controlling the heat in a rotisserie-type broiler. When the control is placed in operation it energizes both the spit motor and the heater and makes and breaks the heater circuit for controlling the temperature of the rotisserie. When the time cycle is over the device deenergizes the motor, breaks both sides of the line to the heating element, and rings a bell.

While a preferred form of the invention has been shown and described it is obvious that many modifications may be made without departing from the spirit and scope of the invention. It is therefore desired to be limited only by the scope of the appended claims.

What is claimed is:

1. A combination time and heat control comprising, a switch, a motor, a cam and pinion mechanically coupled to and driven by said motor, a cam follower engaging and operated by said cam for operating the switch at intervals of short duration, means including a manual control shaft for varying the percentage of time that the switch is closed, a gear train mechanically coupled to and driven by said pinion, a second cam, said second cam being driven by said gear train, a second cam follower engaging and operated by said second cam, said second cam follower being arranged to control the switch in conjunction with the first cam follower, said second cam having a raised cam surface and a notched section, the second cam follower being arranged to cause opening of the switch irrespective of the first cam and follower when the second cam follower is in the notched section of its cam, and to cause operation of the switch by the first cam and follower when the second cam follower is on the raised portion of its cam, and manual control means for setting said second cam, with respect to the second cam follower.

2. In a timer mechanism, a cam having a substantially uniform cam surface and a drop off section, a cam follower biased against and riding the cam, a partial gear mechanically coupled to and moving with the cam in fixed relationship therewith, said gear having an end tooth, a pinion arranged to mesh with the gear for driving the same, said pinion being located so that the end tooth is released by the pinion as the cam follower drops into the drop off section, said drop off section and cam follower being constructed to provide a camming relationship driving the cam forwardly as the cam follower drops into the drop off section.

3. A timer mechanism as set forth in claim 2, in which the cam is mounted on a loose fitting bearing and the cam follower biases the cam toward the pinion, whereby the cam follower holds the gear in engagement with the pinion.

References Cited by the Examiner
UNITED STATES PATENTS

| | | | |
|---|---|---|---|
| 1,223,286 | 4/1917 | Mastrovanni | 116—25 |
| 1,283,481 | 11/1918 | Dupont | 116—167 |
| 2,300,950 | 11/1942 | Lux | 74—3.52 |
| 2,479,922 | 8/1949 | Gates et al. | 161—1 |
| 2,587,187 | 2/1952 | McCormick | 200—38 X |
| 2,678,570 | 5/1954 | Black et al. | 74—569 |
| 2,703,347 | 3/1955 | Constantine | 200—38 X |
| 2,724,276 | 11/1955 | Sears | 74—54 |
| 2,808,478 | 10/1957 | Libermann | 200—30 |
| 2,825,401 | 3/1958 | Kull | 200—38 |
| 2,917,939 | 12/1959 | Harris | 74—435 |

BERNARD A. GILHEANY, *Primary Examiner.*

P. A. REIN, G. MAIER, *Assistant Examiners.*